Dec. 22, 1959   G. N. WILLIS   2,918,163
VIBRATORY ORIENTING DEVICE
Filed Sept. 22, 1958   2 Sheets-Sheet 1

INVENTOR.
GRANT N. WILLIS
BY
Lindsey and Prutzman
ATTORNEYS

Dec. 22, 1959    G. N. WILLIS    2,918,163
VIBRATORY ORIENTING DEVICE
Filed Sept. 22, 1958    2 Sheets-Sheet 2

INVENTOR.
GRANT N. WILLIS
BY
Lindsey and Prutzman
ATTORNEYS

United States Patent Office 2,918,163
Patented Dec. 22, 1959

2,918,163

VIBRATORY ORIENTING DEVICE

Grant N. Willis, Bristol, Conn., assignor to Arthur G. Russell Co., Inc., Forestville, Conn., a corporation of Connecticut Application September 22, 1958, Serial No. 762,340

12 Claims. (Cl. 198—33)

The present invention relates to vibratory feeders of the bowl type and is concerned, more particularly, with an improvement in such feeders rendering them capable of orienting parts which heretofore have been impossible or extremely difficult to feed automatically.

Vibratory feeders of the type to which the present invention relates are intended to receive a batch of unoriented parts and feed them individually and in sequence in a uniformly oriented manner. To accomplish this purpose, the bowl is rapidly oscillated about its axis and at the same time is reciprocated vertically so that the parts placed in the bowl will travel upwardly in sequence on a helical ramp disposed on the interior of the bowl. The configuration of the ramp is selected so that orienting and sequential feeding will take place. Unfortunately, such mechanisms of the prior art are not suitable for the rapid feeding and orientation of many parts whose configuration does not adapt them to orientation by the ramp method. Notable among such parts are the commonly used socket head set screws and slotted set screws which have no radial protuberances to distinguish the head end from the other end of the part.

An object of the present invention is to provide a means in vibratory feeder bowls which is effective for orienting such parts as socket head set screws, slotted set screws, and other parts which are configured so that they cannot be effectively oriented by means of ordinary ramp arrangements.

A further object is to provide such an orienting means which is of simple and inexpensive construction and which can be incorporated in feeder bowls which are otherwise of standard design without undesirably increasing the size or expense of the feeder.

Another object is to provide orienting means which is highly effective and fool-proof in operation, which will function over long periods of time without undue wear or failure, and which requires no motivating force other than the feeder device itself.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
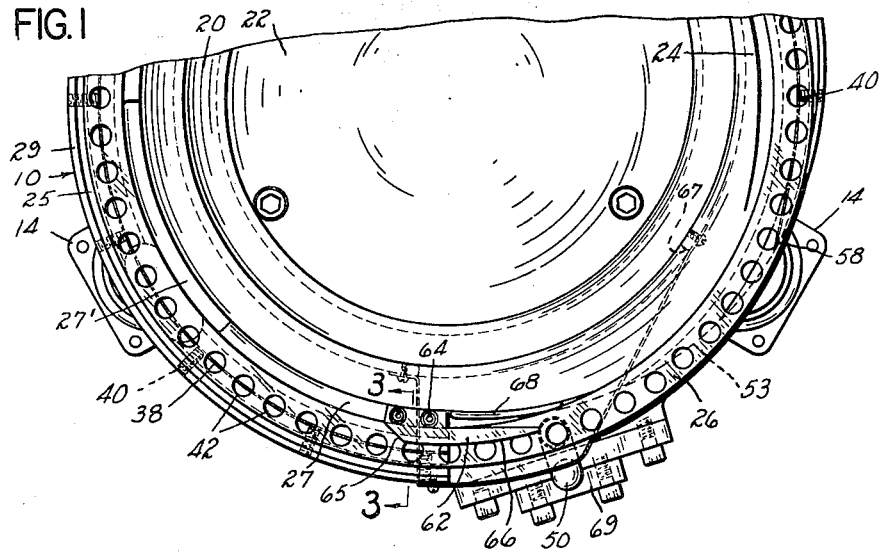
Fig. 1 is a fragmentary top plan view of a vibratory feeder incorporating the invention.
Figure 2:
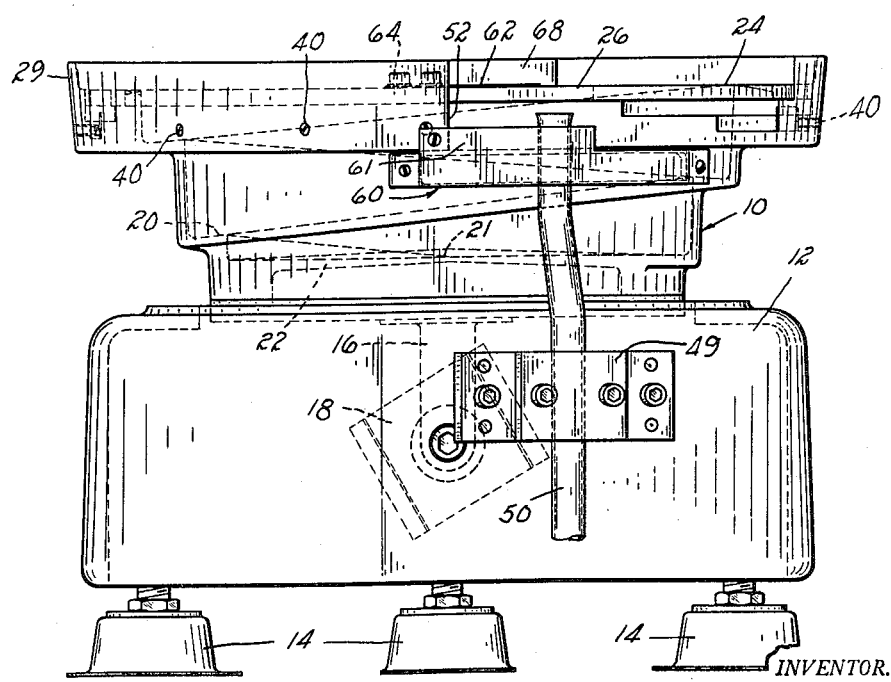
Fig. 2 shows in side elevation the device of Fig. 1.

Referring to the drawings, an embodiment of the present invention has been incorporated, by way of illustration, in a vibratory feeder comprising the bowl, generally designated 10, mounted for vibratory movement on a base 12; the base 12 being supported on adjustable legs 14. The bowl 10 is provided with three depending arms 16 (one shown) which in turn are each connected to a vibrator unit 18 mounted in the base and of the type disclosed and claimed in my copending application Serial No. 686,751 filed September 27, 1957. The vibrator unit 18 imparts helical oscillatory motion to the bowl 10 which is to say that the bowl is oscillated about its vertical axis and at the same time is reciprocated vertically. The means by which the bowl is oscillated forms no part of the present invention, and the unit 18 has been shown merely as exemplary.

The bowl 10 is provided with an internal expanding helical feed ramp 20 which has its lower end beginning at 21 adjacent the periphery of the bottom wall 22 of the bowl and which merges at its upper end, as indicated at 24, with an annular shelf or land which includes the two surfaces 25, 27 separated by an intermediate channel 30. In the embodiment shown in the drawing, the bowl 10 and its ramp 20 are formed as an integral casting, although they could be assembled from separate parts if desired.

The channel 30 is provided with stepped side walls which include a shoulder 28 for supporting an apertured flat ring 26. The apertured flat ring 26 substantially closes the upper end of channel 30 but fits sufficiently loosely within the channel 30 so that it can revolve or rotate relative to the bowl 10. The result is that when the bowl is oscillated as described, the "floating" ring 26 will revolve or rotate in a continuous manner relative to the bowl. The upper surface of the ring 26 is substantially flush with the outer surface 25 which is provided at its outer perimeter or margin with a flange-like outer wall 29. The inner surface 27 of the annular shelf or land is preferably inclined toward the ring 26 throughout most of its length so as to assist in directing the parts being fed to the ring 26. A portion of the surface 27 as indicated at 27′ is, however, inclined in the opposite direction so that any parts remaining on the surface of the ring at this point will be assisted in returning to the interior of the bowl.

Clamped against a lower vertical wall 36 of the channel 30 is a support rail or blade 38 held in position by the set screws 40 so that the upper edge of the rail or blade 38 extends along underneath the ring 26 but spaced therefrom in alignment with the centers of a sequence or series of apertures 42 provided in the ring 26. In the specific embodiment the apertures 42 are vertical bores dimensioned for the endwise reception of the slotted set screws 44 or socketed set screws 46 which are used in Figs. 3–7 of the drawings to illustrate one mode of operation of the device.

The shelf or lands 25, 27 are cut back radially at 52 and thence arcuately along the line 53 shown dotted in Fig. 1 to form a discharge station for the parts being fed. Located at the discharge station is a vertically extending discharge tube 50 clamped to the side wall of the base by the bracket 49 with the upper end of the tube 50 disposed beneath the ring 26 for registry with the holes 42 therein. The discharge tube 50 extends upwardly through a return chute or tray 60, which tray 60 has a side wall 61 and bottom wall 63 and is secured to the bowl by screws. The bottom wall 63 is preferably inclined inwardly toward the bowl and communicates with an opening 67 in the side wall of the bowl so that parts received in the tray will be returned to the bowl for recycling.

Figure 7:
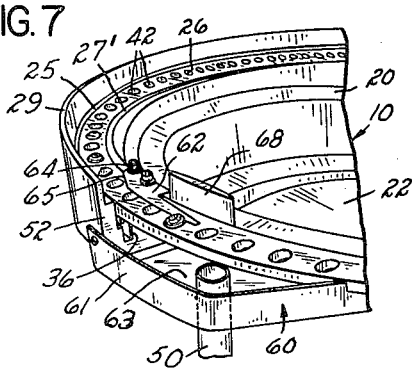
Fig. 7 shows in fragmentary perspective the article rejection and discharging portions of the device of Figs. 1 and 2.

Mounted on the shelf or land surface 27 adjacent the edge 52 is a retaining blade 62 fixed thereon by screws 64. The blade 62 has an inclined camming edge 65 and an arcuate holding or clamping edge 66 which extends along the tops of the holes 42. The retaining blade 62 lies closely adjacent the upper surface of the ring 26 without, however, being in clamping engagement therewith or otherwise interfering with the rotation of ring 26. A guard fence 68 is provided behind the blade 62 as best shown in Fig. 7.

In the operation of the vibratory feeder of the present invention the bowl 10, as explained above, is subjected to vibratory motion sufficient to move the parts placed therein in a path such that the parts will travel upwardly along the ramp 20. This same vibratory motion will also impart rotational movement to the floating ring 26 since the ring 26 is loosely mounted in the channel 30 and thus is free to revolve about its axis. The parts which travel upwardly along the ramp 20 as a result of the vibratory motion imparted to the bowl will thereupon move onto the upper surface of the ring 26 for rotation along and with the ring. Since the ring 26 has been provided with a series of holes 42 which are dimensioned to receive the parts being fed in an endwise direction, the parts will rapidly fill these holes by gyrating and tumbling end-over-end on the upper surface of the ring 26 until they become aligned with and fall into the holes 42, whereupon the parts rest on the guide rail 38 and travel in a circular direction about the top of the bowl within the apertures of the ring 26.

Figure 3:
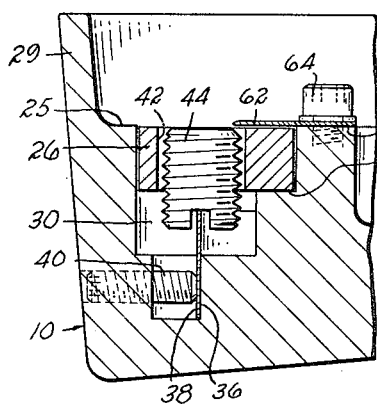
Fig. 3 is a fragmentary vertical section taken along line 3—3 of Fig. 1 and showing a slotted headless set screw positioned for rejection by the device.
Figure 4:
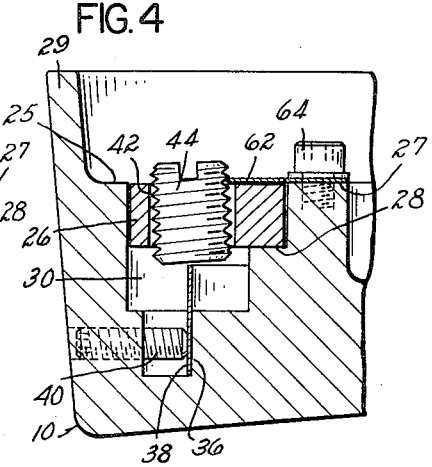
Fig. 4 is a view similar to Fig. 3 but showing the same set screw oriented for transfer to a discharge tube for removal of properly oriented articles.

Assuming for purposes of illustration that the parts being fed are slotted set screws as shown in Figs. 3 and 4 of the drawings, the set screws will be held in an elevated position determined by the height of the support blade 38. In the event that the set screw enters the hole 42 with its slotted end downwardly, the vibration imparted to the device will cause the set screw to gyrate and rotate until the slotted end fits over and straddles the support blade 38 thus permitting the set screw to enter into the hole 42 to such an extent that its upper end is below the selector blade 62. However, if the set screw 44 enters the hole 42 in a reverse direction, it will hold at a higher elevation as shown in Fig. 4 so that the threads of the screw are engageable with the selector blade 62.

Accordingly, as the ring 26 rotates with the set screws 44 disposed in the holes 42, the set screws are brought sequentially to the discharge station where the set screws which are not properly oriented, i.e. in the position shown in Fig. 3, will not engage with the retaining blade 62 and hence will drop into the tray 60 and be returned to the bowl for recycling. The set screws which are properly oriented as shown in Fig. 4 will be engaged by the selector blade 62 and therefore will be retained in the holes 42 until they pass beyond the end of the selector blade 62 whereupon they are released to fall into the discharge tube 50.

Figure 5:
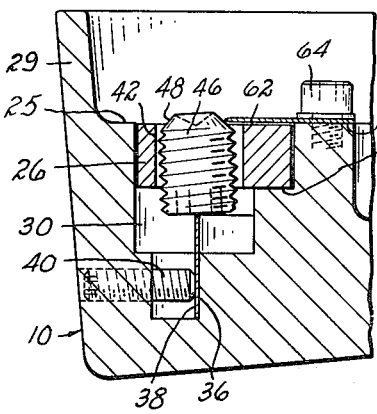
Fig. 5 is a view similar to Fig. 3 but showing a set screw with a chamfered end improperly oriented and positioned for rejection.
Figure 6:
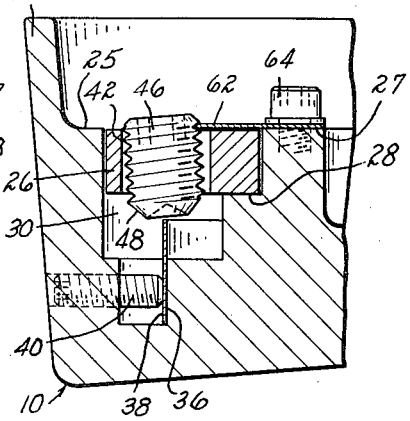
Fig. 6 is a view similar to Fig. 4 but showing the set screw of Fig. 5 properly oriented for transfer to the discharge tube.

As a further illustration of the operation of the device, reference may be had to Figs. 5 and 6 of the drawings which shows the orientation and feeding of socket head set screws 46 provided with a chamfered end 48. In this illustration the support blade 38 holds the set screws 46 at an elevation in the holes 42 of the ring 26 such that if the set screw is disposed with its socketed head downwardly as shown in Fig. 5, the selector blade 62 will be aligned with the chamfered or bevelled end of the set screw and thus will be unable to engage with the set screw. However, if the set screw is disposed in the hole 42 in an inverted position as shown in Fig. 6, the selector blade 62 will engage with the threads of the set screw and thus retain the set screw in the ring 26 until the set screw arrives at the discharge tube 50.

Figure 8:
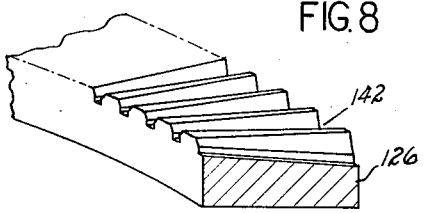
Fig. 8 is a fragmentary perspective view of a floating ring for use with a vibratory feeder bowl, the ring being provided with apertures of a different form.

As will be apparent, the specific embodiment of the device shown in Figs. 1–7 of the drawings will handle a wide range of headless screws by merely changing the height of the support blade 38, the size of the holes 42 in the ring 26 and the thickness of the ring 26. It will be equally apparent that instead of using through openings in the floating ring, orientation of parts by means of the floating ring may be accomplished by the use of suitably dimensioned recesses or indentations in the upper surface of the ring. This is illustrated in Fig. 8 of the drawings wherein the ring 126 is provided with recesses or apertures 142 of varying width and depth in its upper surface which taper radially of the ring and thus will accommodate and orient parts such as those having a larger mass at one end than the other. The term "apertures" as used herein is intended to include recesses and indentations as well as through openings in the ring.

The use of an apertured floating ring in combination with a vibratory feeder bowl and suitable selecting means provides a novel principle for feeding and orienting a wide variety of parts which because of their shape have been impossible or extremely difficult to feed by vibratory devices heretofore. Since the device of the present invention may be varied or modified within the skill of the art and without departing from the invention, all such variations and modifications are intended to be included within the scope of the invention.

I claim:

1. In a vibratory feeder, a bowl adapted to be subjected to helical oscillatory motion, a ring rotatably mounted on the bowl to revolve when the bowl is oscillated, said ring having apertures for reception of the parts being fed, and a ramp in the bowl for feeding parts from the bowl to the ring when the bowl is oscillated.

2. In a vibratory feeder, a bowl having a ramp leading from the bottom to the top thereof and an annular land at the top of the ramp, said annular land having an annular channel therein, a ring loosely mounted in said channel and adapted to revolve relative to the bowl when the bowl is oscillated, said ring having apertures for the reception of parts being fed, and means for releasing the parts from said apertures.

3. In a vibratory feeder, a bowl having a helical ramp leading upwardly from the bottom of the bowl, a floating ring rotatably mounted on the bowl adjacent the top of the ramp for rotation relative to the bowl, said ring having apertures for reception of parts being fed, a supporting surface extending beneath said apertures for engagement by the parts in said apertures, said supporting surface being interrupted to form a discharge station, and means at said discharge station for engagement selectively with said parts.

4. In a vibratory feeder, a bowl having a helical ramp leading upwardly from the bottom of the bowl, a floating ring rotatably mounted on the bowl adjacent the top of the ramp for rotation relative to the bowl, said ring having means for reception of parts being fed, and means responsive to the configuration of the parts on the ring for removing oriented parts from the ring.

5. In a vibratory feeder, a bowl having a helical ramp leading upwardly from the bottom of the bowl, a floating ring rotatably mounted on the bowl adjacent the top of the ramp for rotation relative to the bowl, said ring having apertures dimensioned to receive parts being fed, and means for removing oriented parts from the ring.

6. In a vibratory feeder, a bowl having a helical ramp leading upwardly from the bottom of the bowl, a floating ring rotatably mounted on the bowl adjacent the top of the ramp for rotation relative to the bowl, said ring having through apertures dimensioned to receive parts being fed, a supporting surface extending beneath said apertures for retaining the parts in said apertures, said supporting surface being interrupted to form a discharge station, and means at said discharge station registering with the apertures of the ring to receive the parts therefrom.

7. In a vibratory feeder, a bowl having an annular land at the top thereof and a helical ramp extending from the bottom of the bowl and merging with said annular land at the top thereof, said annular land having an annular channel therein, a ring loosely mounted in said annular channel for rotation relative to the bowl, said ring having spaced apart apertures extending therethrough for the reception of parts being fed, supporting means extending underneath a portion of the ring for engagement by parts in said vertical bores, selector means for engagement with oriented parts seated in the apertures of the ring, said supporting means and selector means being in sequential overlapping relationship to permit engagement of the parts with the supporting means and selector means in sequence, and a discharge tube disposed adjacent the selector means for receiving parts released from the apertures of the ring by the selector means.

8. In a vibratory feeder, a bowl having a helical ramp extending from the bottom of the bowl, a ring rotatably mounted on the bowl adjacent the top of the ramp for rotation relative to the bowl, said ring having means for the reception of parts being fed, selector means disposed adjacent the ring for engagement with parts seated in the vertical bores of the ring, and discharge means associated with the selector means for receiving parts released thereby.

9. In a vibratory feeder, a bowl having a helical ramp extending from the bottom of the bowl, a ring rotatably mounted on the bowl adjacent the top of the ramp for rotation relative to the bowl, said ring having spaced apart apertures for the reception of parts being fed, support means extending underneath a portion of the ring for engagement by parts in said apertures, selector means engageable laterally with parts seated in the vertical bores of the ring, said support means and selector means being located in sequential overlapping relationship to permit engagement of the parts with said means in sequence, and means associated with the selector means for receiving parts which are released by the selector means.

10. In a vibratory feeder, a bowl having a helical ramp extending from the bottom of the bowl, a ring rotatably mounted on the bowl adjacent the top of the ramp for rotation relative to the bowl, said ring having spaced apart vertical bores for the reception of parts being fed, a concentric support rail extending underneath a portion of the ring for engagement by parts in said vertical bores, a selector blade of limited length having an edge disposed above the ring for lateral engagement with parts seated in the vertical bores of the ring, said rail and blade being in sequential overlapping relationship to permit engagement of the parts with the support rail and selector blade in sequence, means disposed adjacent the end of the support rail for receiving and returning parts to the bowl which are not retained by the selector blade, and means disposed adjacent the end of the selector blade for receiving parts as they are released from engagement with the selector blade.

11. In a vibratory feeder, a bowl having an annular land at the top thereof and a helical ramp extending from the bottom of the bowl and merging with said annular land at the top thereof, said annular land having an annular channel therein, a ring loosely mounted in said annular channel for rotation relative to the bowl, said ring having spaced apart vertical bores for the reception of parts being fed, a concentric support rail extending underneath a portion of the ring for engagement by parts in said vertical bores, a selector blade of short length having an arcuate edge concentric with the ring for lateral engagement with parts seated in the vertical bores of the ring, said rail and blade being in sequential overlapping relationship to permit engagement of the parts with the support rail and selector blade in sequence, and means disposed beneath the ring adjacent the end of the selector blade for receiving parts as they are released from engagement with the selector blade.

12. In a vibratory feeder, a bowl having an annular land at the top thereof and an expanding helical ramp extending from the bottom of the bowl and merging with said annular land at the top thereof, said annular land having an annular channel therein, a ring loosely mounted in said annular channel for rotation relative to the bowl, said ring having spaced apart vertical bores for the endwise reception of parts being fed, a concentric support rail of relatively thin cross section extending underneath a portion of the ring for engagement by parts in said vertical bores, a selector blade of short length having an arcuate edge concentric with the ring and disposed above the ring for lateral engagement with parts seated in the vertical bores of the ring, said rail and blade being in sequential overlapping relationship to permit engagement of the parts with the support rail and selector blade in sequence, a collecting tray communicating with the interior of the bowl disposed at the end of the support rail for receiving and returning parts to the bowl which are not retained by the selector blade, and a discharge tube disposed beneath the ring adjacent the end of the selector blade for receiving parts as they are released from engagement with the selector blade.

References Cited in the file of this patent

UNITED STATES PATENTS 2,806,494     Kull _____ Sept. 17, 1957